(12) United States Patent
Hiroi

(10) Patent No.: US 7,963,884 B2
(45) Date of Patent: Jun. 21, 2011

(54) STRADDLE TYPE VEHICLE

(75) Inventor: Kazutaka Hiroi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 895 days.

(21) Appl. No.: 11/867,403

(22) Filed: Oct. 4, 2007

(65) Prior Publication Data

US 2008/0099268 A1    May 1, 2008

(30) Foreign Application Priority Data

Oct. 27, 2006    (JP) .............................. 2006-292898

(51) Int. Cl.
*B60W 10/04* (2006.01)
(52) U.S. Cl. ....................................... 477/109; 477/77
(58) Field of Classification Search ........................ None
See application file for complete search history.

(56) References Cited

U.S. PATENT DOCUMENTS 5,129,286 A * 7/1992 Nitz et al. .................... 477/102
5,970,951 A * 10/1999 Ito .............................. 123/335
6,085,607 A    7/2000 Narita et al.

FOREIGN PATENT DOCUMENTS

JP    11-82709 A    3/1999

* cited by examiner

*Primary Examiner* — David D. Le
*Assistant Examiner* — Justin Holmes
(74) *Attorney, Agent, or Firm* — Keating & Bennett, LLP

(57) ABSTRACT

A straddle vehicle comprises a single actuator that controls clutch engagement as well as gear shifting. The actuator can be connected to the clutch and the shiftable transmission with a rotating shaft. When an engine speed reaches or exceeds a preset value during an up-shift operation, an ECU or other controller reduces the engine output to facilitate a smooth gear shift.

11 Claims, 15 Drawing Sheets

Ignition pattern (a)

| First cycle | Second cycle | Third cycle | Fourth cycle | Fifth cycle | Sixth cycle | Seven cycle | Eighth cycle |
|---|---|---|---|---|---|---|---|
| 1 | 1 | 1 | 1 | 1 | 1 | 1 | 1 |

1 : Ignited
2 : Not ignited (b)

| Pattern number | Ignition pattern | Set engine speed (rpm) |
|---|---|---|
| 1 | 0 1 1 1 1 1 1 1 | Ne1 |
| 2 | 0 1 1 1 0 1 1 1 | Ne2 |
| 3 | 0 1 0 1 0 1 1 1 | Ne3 |
| 4 | 0 1 0 1 0 1 0 1 | Ne4 |
| 5 | 0 0 0 1 0 1 0 1 | Ne5 |
| 6 | 0 0 0 1 0 0 0 1 | Ne6 |
| 7 | 0 0 0 0 0 0 0 1 | Ne7 |
| 8 | 0 0 0 0 0 0 0 0 | Ne8 |

| Shift stage toward which gearshift operation is made | | First speed |
|---|---|---|
| Shift up | First shift stage to second shift stage | $\Delta\theta_{12}$ |
| | Second shift stage to third shift stage | $\Delta\theta_{23}$ |
| | Third shift stage to fourth shift stage | $\Delta\theta_{34}$ |
| Shift down | Second shift stage to first shift stage | $\Delta\theta_{21}$ |
| | Third shift stage to second shift stage | $\Delta\theta_{32}$ |
| | Fourth shift stage to third shift stage | $\Delta\theta_{43}$ |

$$\begin{pmatrix} \Delta\theta_{12} < \Delta\theta_{23} < \Delta\theta_{34} \\ \Delta\theta_{21} < \Delta\theta_{32} < \Delta\theta_{43} \end{pmatrix}$$

*Figure 13*

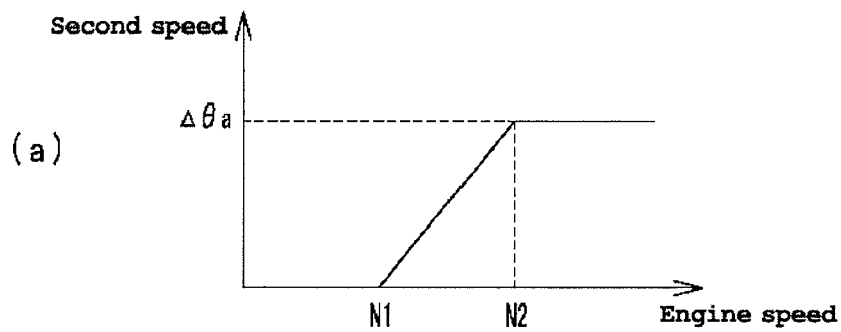
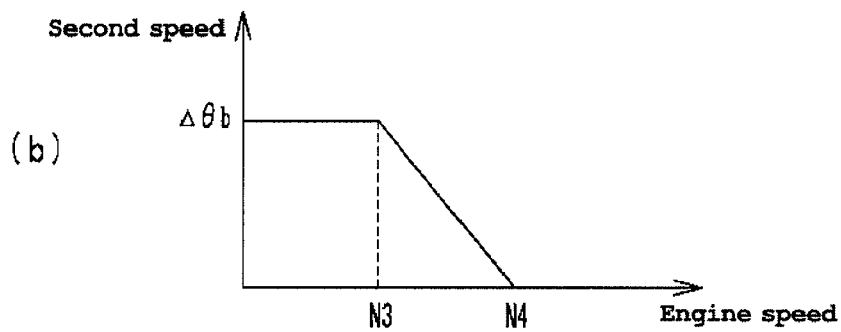
Figure 14

STRADDLE TYPE VEHICLE

CROSS-REFERENCE TO RELATED APPLICATIONS

This application claims the benefit of Japanese Patent Application No. JP 2006-292898, filed on Oct. 27, 2006, which is herein incorporated by reference in its entirety.

BACKGROUND OF THE INVENTION

1. Field of the Invention

The present invention generally relates to a straddle type vehicle that engages and disengages a clutch and also moves a shifter using a common actuator.

2. Brief Description of the Related Art

A straddle type vehicle can comprise an actuator such as, for example, a motor, that rotates a shift shaft. As the shift shaft rotates, a clutch can be disengaged and engaged and gears can be shifted (see, for example, JP-A-Hei 11-82709 and U.S. Pat. No. 6,085,607). Thus, the straddle type vehicle uses a common actuator to drive both of the clutch and the shifter in a gearshift operation.

In some drive situations, a rider can up-shift while a throttle valve is in an open position. The references mentioned above describe that the clutch can be quickly engaged when the rider operates an up-shift switch without returning an accelerator toward the closed position (see paragraph numbers 0057 to 0058 of JP-A-Hei 11-82709).

SUMMARY OF THE INVENTION

However, straddle type vehicles using a common actuator to drive both the clutch and the shifter take longer for the gearshift operation relative to straddle type vehicles using separate actuators to drive the clutch and the shifter. Therefore, if the rider up-shifts without closing the throttle valve, the engine speed will rapidly rise after the clutch is disengaged. Respective rotational speeds of a clutch drive side and a clutch driven side differ from each other greatly and a large shock (i.e., shift shock) can be generated when the clutch is subsequently engaged.

While the straddle type vehicles disclosed in the references mentioned above quickly engage the clutch if the vehicle has a high engine speed during gearshift operation, the clutch occasionally is engaged before the engine speed rises above a desired level. Even in such situations, however, shift shock may not be fully avoidable.

Thus, one aspect of an embodiment of the present invention seeks to reduce a shock generated when the clutch is engaged during a gearshift operation in a straddle type vehicle where a common power source is used to drive both a clutch and a shifter. Such an aspect will enhance the perceived performance of the vehicle. Such a straddle type vehicle can comprise an engine control device that executes an engine output reducing process such that the power of the engine can be reduced below a preset speed when the engine speed reaches or exceeds that preset speed during an up-shift operation. In some configurations, the engine output reducing process can be executed not only when the engine speed reaches or exceeds the preset value during or immediately following an up-shift but also when the engine speed has reached or exceeded the preset value when the up-shift is initiated. Because the power output of the engine is reduced, even though the up-shift operation is made while the throttle valve is in an open position, the engine speed does not rise rapidly. Accordingly, shift shock can be suppressed when the clutch is engaged.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIG. 11($b$) is a graph showing changes caused by an engine output reducing process over time.

FIG. 12($a$) is a diagram showing an ignition pattern in a normal output control. FIG. 12($b$) is a diagram showing ignition patterns in an engine output reducing process.

FIG. 13 is a table showing one example of a first table.

FIGS. 14($a$) and ($b$) are graphs showing one example of a second table.

DETAILED DESCRIPTION OF THE PREFERRED EMBODIMENTS

Figure 1:
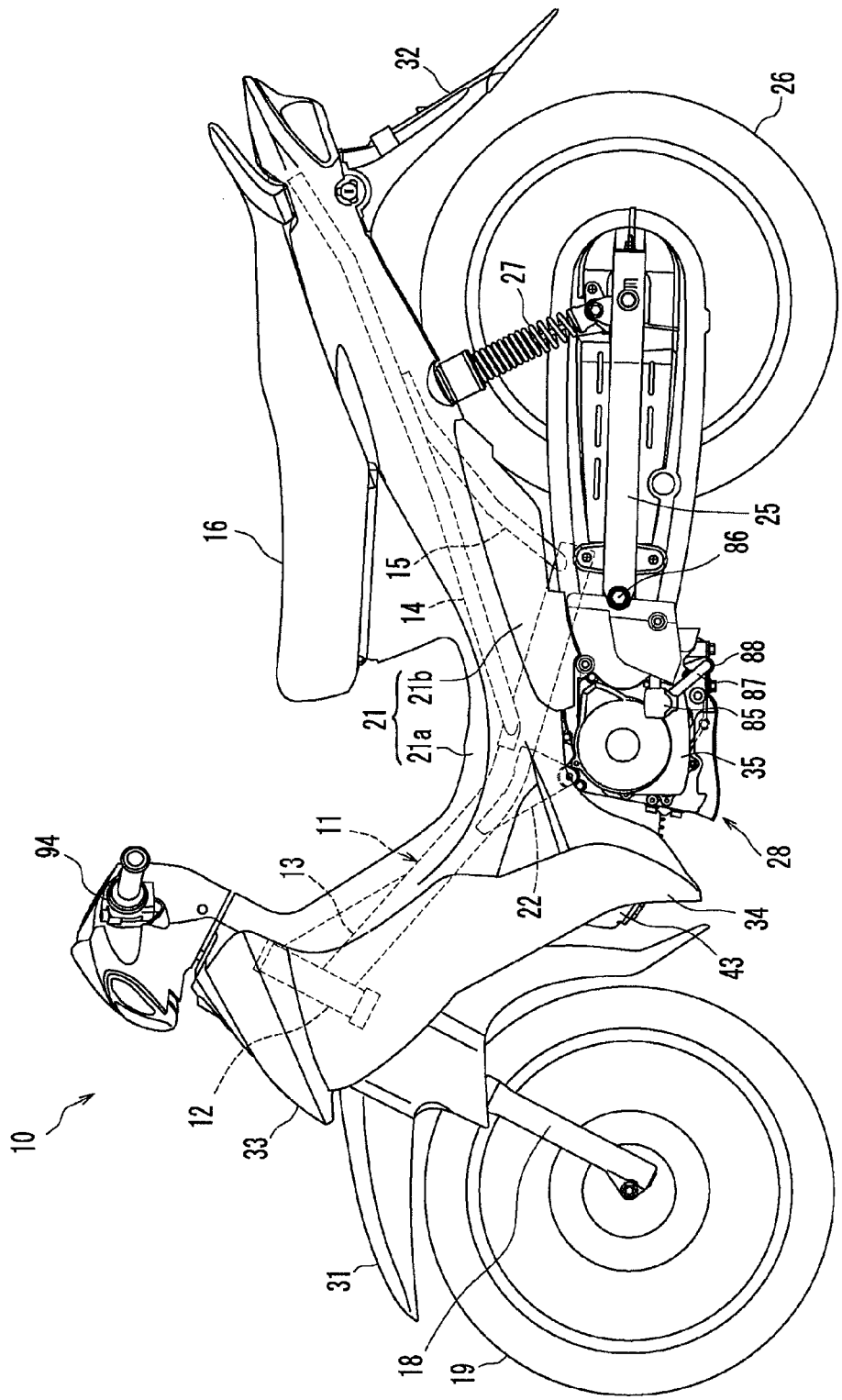
FIG. 1 is a left side elevation view of a motorcycle arranged and configured in accordance with certain features, aspects and advantages of an embodiment of the present invention.

With reference initially to FIG. 1, the illustrated straddle type vehicle is a motorcycle 10. Other straddle type vehicles also can benefit from certain features, aspects and advantages of the present invention. As used herein, a straddle type vehicle generally refers to a vehicle in which the legs of a rider are position to lateral sides of a seat or other seating area. The motorcycle 10 can be a so-called moped-type or scooter-type of motorcycle. However, these are but two examples of the type of vehicles that can benefit from certain features, aspect and advantages of the present invention. Thus, by illustrating a moped-type or scooter-type of motorcycle, the maximum speed, displacement amount or the like of the vehicle is not meant to be restrict nor is the size or the like of the vehicle meant to be restricted. Thus, the motorcycle can be of the type having a fuel tank placed in front of a seat and the straddle type vehicle can be a type of vehicle other than the illustrated motorcycle, such as an all terrain vehicle, for example but without limitation.

The illustrated motorcycle 10 comprises a vehicle frame 11. The frame 11 preferably supports a seat 16 on which a rider sits. In the following descriptions, the fore to aft and lateral directions mean directions which the rider sitting on the seat 16 perceives. The vehicle frame 11 comprises a steering head pipe 12, a single main frame 13 extending obliquely downward and rearward from the steering head pipe 12, a pair of right and left seat rails 14 extending obliquely upward and rearward from a mid portion of the main frame 13, and a pair of right and left back stays 15 extending obliquely upward and rearward from the main frame 13 in the rear of the seat rails 14. The back stays 15 are connected to a rear portion of the main frame 13 and to mid portions of the respective seat rails 14. The steering head pipe 12 supports a front wheel 19 via a front fork 18.

A top surface and right and left surfaces of the vehicle frame 11 are mainly covered with a top cover 21*a* and side covers 21*b*. Thus, a vehicle cover 21 can comprise the top cover 21*a* and the side covers 21*b*.

A right first engine bracket 22 and a left first engine bracket 22 protrude downward from the mid portion of the main frame 13. Although not shown, a right second engine bracket, a left second engine bracket, a right rear arm bracket and a left rear arm bracket extend from the rear end portion of the main frame 13. In the following descriptions, the brackets attached to the main frame 13 and so forth comprise portions of the vehicle frame 11.

The rear arm brackets preferably protrude downward from the rear portion of the main frame 13. The rear arm brackets can comprise a pivot shaft 86. The pivot shaft 86 pivotally carries a forward portion of a rear arm 25. A rear end portion of the rear arm 25 supports a rear wheel 26. The vehicle frame 11 suspends a rear portion of the rear arm 25 via cushion units 27 or the like.

The motorcycle 10 comprises a front fender 31 covering a top surface and a rear surface of the front wheel 19 and a rear fender 32 covering a surface of the rear wheel 28 facing obliquely upward and rearward. Also, the motorcycle 10 comprises a front cowling 33 and right and left leg shields 34 in addition to the vehicle cover 21 described above.

The vehicle frame 11 supports an engine unit 28 that drives the rear wheel 26. The engine unit 28 comprises a crankcase 35 and a cylinder 43 that extends forward or obliquely upward and forward from the crankcase 35. Footrests 85 are disposed on the right and left sides of the engine unit 28. The crankcase 35 supports the right and left footrests 85 via a coupling bar 87 and an attaching plate 88 that is fixed to the coupling bar 87.

Next, with reference primarily to FIG. 2 and FIG. 3, a structure of the engine unit 28 will be described. The engine unit 28 comprises an engine 29. The engine 29 comprises a crankshaft 30, a centrifugal clutch 36, a gearshift clutch 37 that is disengaged and engaged when a gearshift operation is made, and a gear shifter 38. Although the engine 29 can have any suitable configuration, the illustrated engine 29 comprises a four-stroke, single cylinder engine. The engine 29 is not limited to an internal combustion engine such as, for example, the gasoline engine used in this embodiment and can be an electric motor or the like. Further, in some configurations, the engine can be a combination of the gasoline engine and the electric motor.

Figure 3:
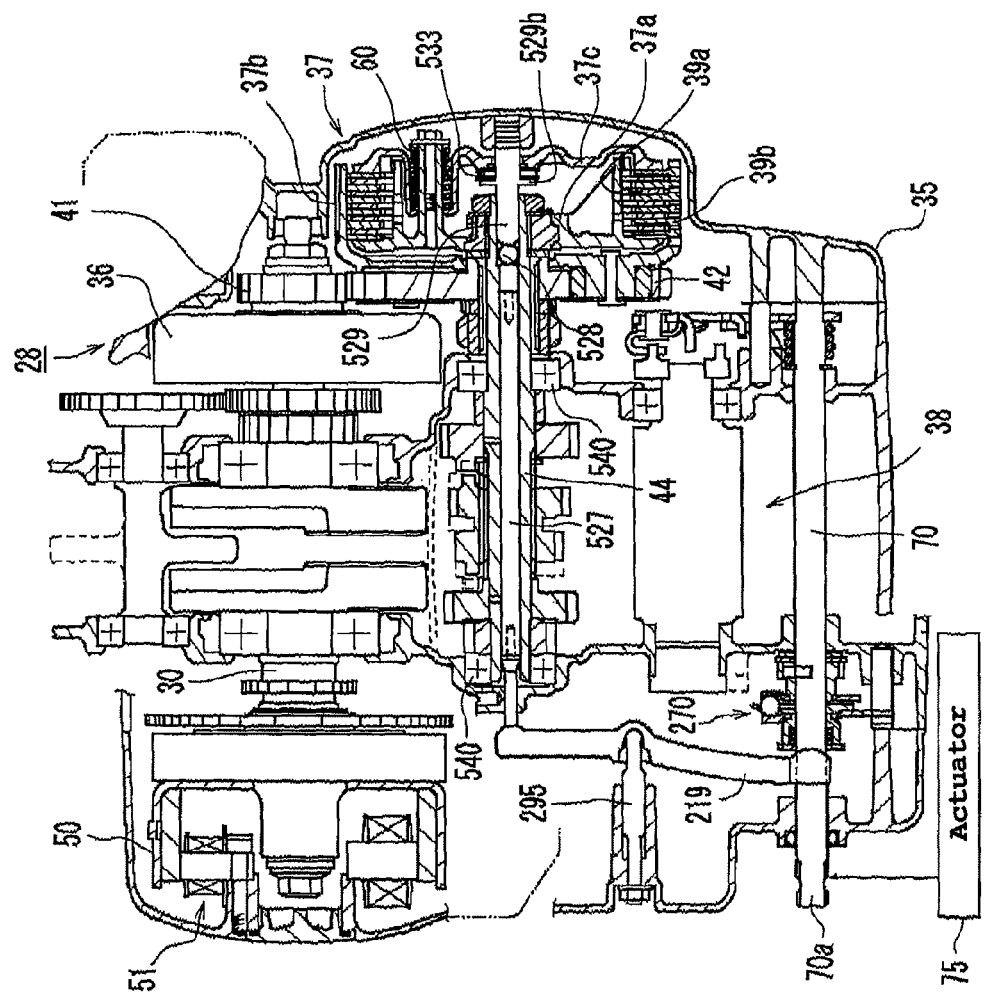
FIG. 3 is a cross sectional view of the engine unit of FIG. 2.

As shown in FIG. 3, the centrifugal clutch 36 can be mounted to a right end portion of the crankshaft 30. Although not shown, the centrifugal clutch 36 comprises a clutch boss fixed to the crankshaft 30 and a clutch housing. The centrifugal clutch 36 is disengaged while the engine is idling and is engaged when the motorcycle is moving. That is, the centrifugal clutch 36 is disengaged if a rotational speed of the crankshaft 30 (i.e., the engine speed) is less than a predetermined speed and is engaged if the rotational speed exceeds the predetermined speed.

The gearshift clutch 37 preferably comprises a wet type, multiple plate clutch and comprises a clutch boss 37*a* and a clutch housing 37*b*. However, the gearshift clutch 37 is not limited to any particular type. The centrifugal clutch 36 comprises a gear 41 and the clutch housing 37*b* of the gearshift clutch 37 also comprises a gear 42. These gears 41, 42 mesh with each other. Accordingly, the clutch housing 37*b* of the gearshift clutch 37 rotates with the centrifugal clutch 36, or more specifically the illustrated clutch housing of the gearshift clutch 37 rotates with the clutch housing of the centrifugal clutch 36.

The illustrated clutch boss 37*a* is mounted to a main shaft 44 and rotates with the main shaft 44. The clutch housing 37*b* is mounted to the main shaft 44 for rotation about the main shaft 44. The clutch boss 37*a* comprises a plurality of friction plates 39*a* while the clutch housing 37*b* comprises a corresponding plurality of clutch plates 39*b*. Each friction plate 39*a* is interposed between respective clutch plates 39*b*, 39*b* that neighbor each other.

A pressure plate 37*c* is disposed on the right side of the illustrated clutch boss 37*a*. The pressure plate 37*c* is axially moveable and is urged leftward in FIG. 3 by a compression spring 60. That is, the pressure plate 37*c* is urged in a direction in which the pressure plate 37*c* compresses the friction plates 39*a* and the clutch plates 39*b* together. When the pressure plate 37*c* moves rightward against the urging force of the compression spring 60, the friction plates 37*c* and the clutch plates 39*b* separate from each other. The gearshift clutch 37 is thus disengaged.

Figure 2:
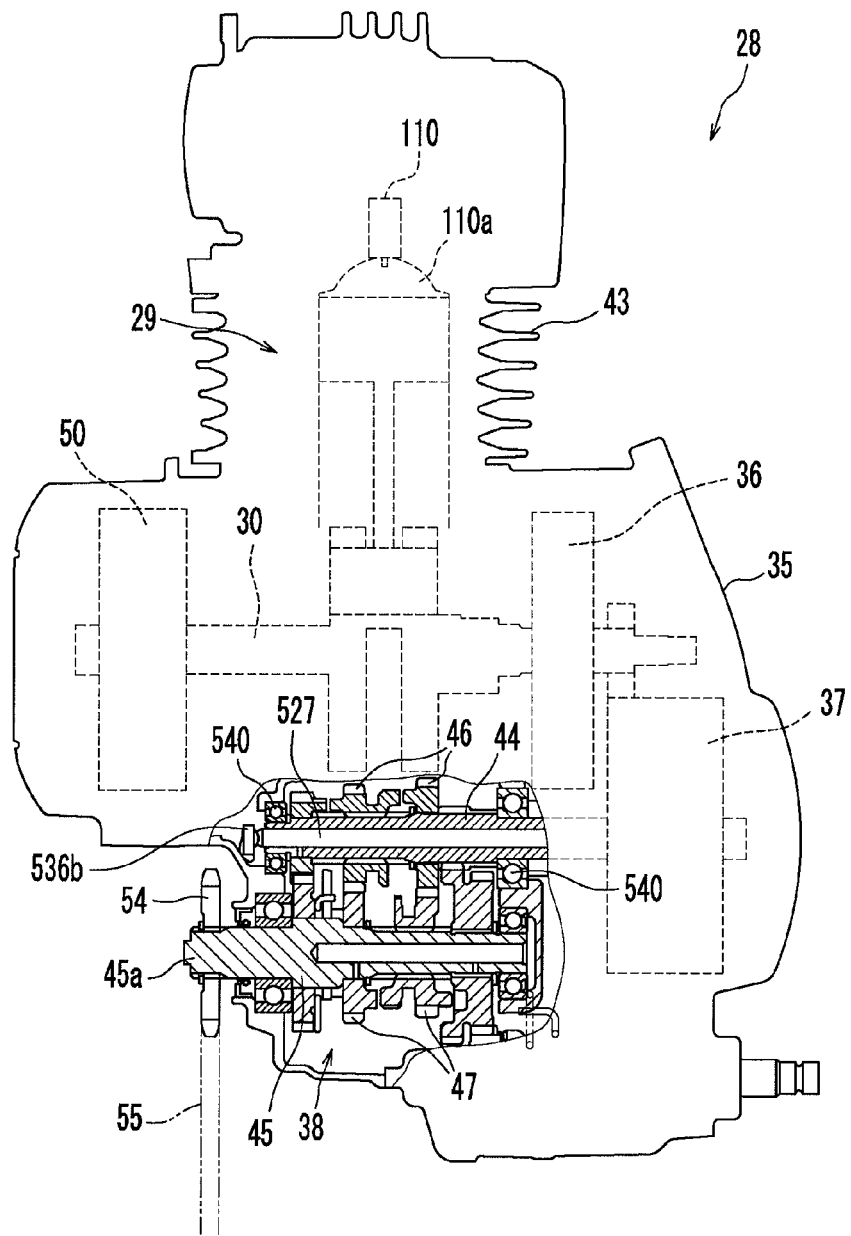
FIG. 2 is a partially sectioned view of an engine unit of the motorcycle of FIG. 1.

As shown in FIG. 2, a plurality of shiftable gears 46 are arranged circumferentially around the main shaft 44. A plurality of corresponding shiftable gears 47 are mounted to a drive shaft 45 that extends generally parallel to the main shaft 44. The shiftable gears 46 on the main shaft 44 and the shiftable gears 47 on the drive shaft 45 mesh with each other. Either the shiftable gears 46 or the shiftable gears 47, or both of them are mounted to idle relative to the main shaft 44 or the drive shaft 45, except the gears that are selected. Accordingly, driving force is transmitted from the main shaft 44 to the drive shaft 45 through any selected pair of the shiftable gears.

Figure 4:
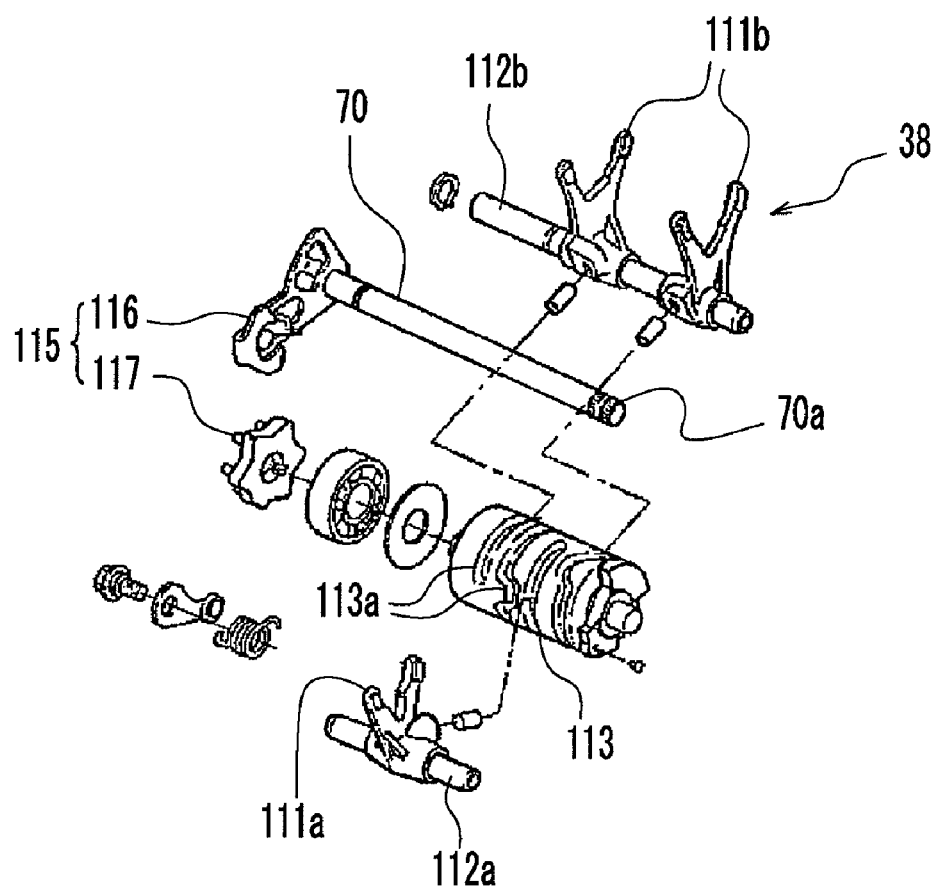
FIG. 4 is an exploded perspective view of a portion of a gear shifter of the motorcycle of FIG. 1.

The shiftable gears are selected via a shift cam 113 (see FIG. 4). As shown in FIG. 4, the gear shifter 38 includes a shift fork 111*a* that slides the shiftable gears 46 in the axial direction of the main shaft 44 and a slide rod 112*a* that supports the shift fork 111*a* for sliding movement. Also, the gear shifter 38 includes a shift fork 111*b* that slides the shiftable gears 47 in the axial direction of the drive shaft 45 and a slide rod 112*b* that supports the shift fork 111*b* for slide movement. Cam grooves 113*a* are circumferentially formed around the shift cam 113. The shift forks 111*a*, 111*b* slide along the cam grooves 113*a*.

The shift cam 113 rotates with the rotation of the shift shaft 70 through a ratchet mechanism 115. The ratchet mechanism 115 is a mechanism that rotates the shift cam 113 at fixed intervals (angles) to regularly move the shift forks 111*a*, 111*b*. The ratchet mechanism 115 thus has ratchet functions effective in both forward and reverse directions to shift stages one at a time for changing gear ratios. A shift arm 116 of the ratchet mechanism 115 transmits the rotation of the shift shaft 70 and simultaneously restricts a stroke of the shift shaft 70 to prevent an overrun of the shift cam 113. The stopper plate 117 of the ratchet mechanism 115 fixes the shift cam 113 to a predetermined position.

As shown in FIG. 3, a bearing 540 supports the main shaft 44, which preferably is hollow, for rotation. A first push rod 527, a ball 528 and a second push rod 529 are movably inserted into the hollow of the main shaft 44, and their axial movement shifts the pressure plate 37c in a lateral direction. The second push rod 529 has a flange 529b. A bearing 533 is interposed between the flange 529b and the pressure plate 37c. Thus, the pressure plate 37c is rotatable, although the second push rod 529 is not rotatable.

Figure 5:
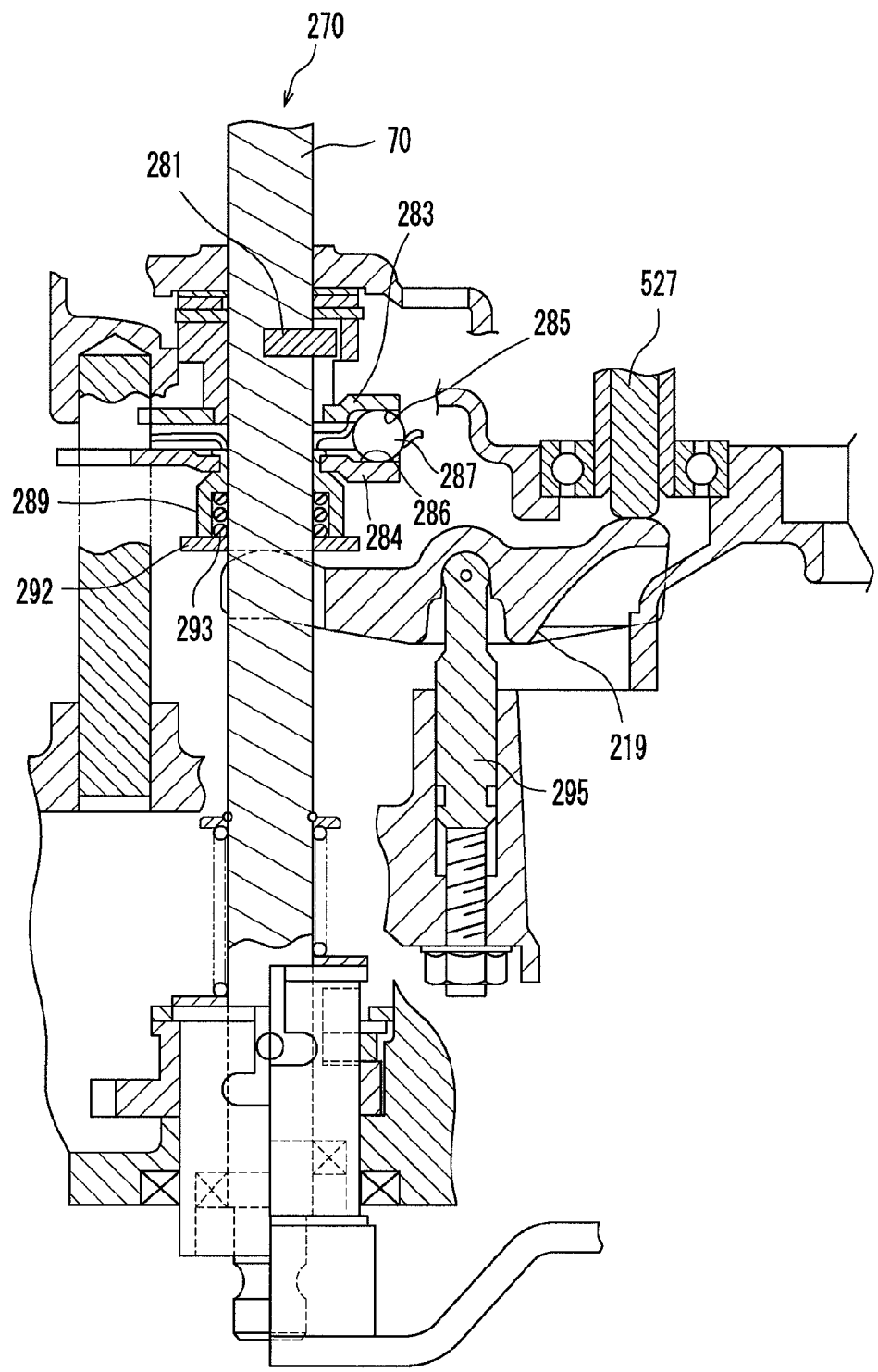
FIG. 5 is an enlarged cross sectional view showing a clutch operating power transmitting mechanism.

A clutch operating power transmitting mechanism 270 converts the rotation of the shift shaft 70 to a reciprocal movement of the first push rod 52. FIG. 5 is an enlarged cross sectional view of the clutch operating power transmitting mechanism 270 shown in FIG. 3. The clutch operating power transmitting mechanism 270 shown in FIG. 5 is a ball type cam mechanism which converts the rotation of the shift shaft 70 into the desired reciprocal movement.

The clutch operating power transmitting mechanism 270 comprises a first cam plate 283 that rotates together with the shift shaft 70 and a second cam plate 284 that opposes the first cam plate 283. The first cam plate 283 is fixed to the shift shaft 70 with a coupling pin 281. Respective opposing surfaces of the first cam plate 283 and the second cam plate 284 comprise a first cam groove 285 and a second cam groove 286.

The illustrated clutch operating power transmitting mechanism 270 comprises three balls 287 (FIG. 5 shows only one of them) that are interposed between the first cam plate 283 and the second cam plate 284. Those balls 287 engagingly fit in the first cam groove 285 and the second cam groove 286. Each of the first and second cam plates 283, 284 has a disk-like shape.

The second cam plate 284 is fixed to a boss 289, which is movable in the axial direction of the shift shaft 70. A press plate 292 contacts with a bottom end of the boss 289. The press plate 292 touches a pressure lever 219 described later. A compression coil spring 293 is interposed between the press plate 292 and the boss 289.

A left end portion of the pressure lever 219 touches the pressure plate 292. A right end portion of the pressure lever 219 touches the first push rod 527 (see FIG. 3 as well). A support shaft 295 supports a central portion of the pressure lever 219 in its longitudinal direction. The pressure lever 219 is pivotable about a contact point of the support shaft 295 which functions as a fulcrum.

When the shift shaft 70 rotates with the rotation of the actuator 75 (see FIG. 3), the first cam plate 283 also rotates together with the rotation of the shift shaft 70. Because the second cam plate 284 does not rotate together with the shift shaft 70, the first cam plate 283 rotates relative to the second cam plate 284. As a result of the relative motion between the plates 283, 284, the ball 287 moves circumferentially in the cam groove 286 of the second cam plate 284 while being held in the cam groove 285 of the first cam plate 286. When the shift shaft 70 further rotates, the ball 287 surmounts the cam groove 286 and comes out from the cam groove 286. Because the ball 287 comes out from the cam groove 286, the second cam plate 284 is moved away from the first cam plate 283 by the ball 287 in the axial direction of the shift shaft 70. Because of the movement of the second cam plate 284, the press plate 292 presses the left end portion of the pressure lever 219 (downward in FIG. 5).

When the press plate 292 presses the left end portion of the pressure lever 219, the pressure lever 219 pivots about the contact point of the support shaft 295, which functions as the fulcrum. Thus, the right end portion of the pressure lever 219 presses the first push rod 527 (upward in FIG. 5). Because the pressure lever 219 presses the first push rod 527, the first push rod 527, as shown in FIG. 3, slides rightward. The first push rod 52 thus presses the second push rod 529 with the ball 528. Thus, the second push rod 529 slides rightward in FIG. 3.

As shown in FIG. 3, the axial movement of the second push rod 529 moves the pressure plates 37c rightward against the urging force of the compression spring 60. As a result, the compressive contact state of the friction plates 39a and the clutch plates 39b is released and the gearshift clutch 37 is disengaged.

As discussed above, the shift shaft 70 and the pressure plate 37c are coupled together by the pressure lever 219, the first push rod 527, the ball 528 and the second push rod 529. The pressure plate 37c thus moves in accordance with the rotation of the shift shaft 70. That is, upon the start of the rotation of the shift shaft 70, the pressure plate 37c moves rightward. When a rotational angle of the shift shaft 70 reaches a preset angle (clutch disengagement start angle), the gearshift clutch 37 is disengaged. When the shift shaft 70 further rotates and its angle reaches another preset angle (shift start angle), the shift cam 113 rotates (see FIG. 4) to cause a gearshift operation.

As shown in FIG. 3, a flywheel magneto 50 is mounted to a left end portion of the crankshaft 30. The flywheel magneto 50 forms a rotor of a generator 51.

A portion of the illustrated shift shaft 70 protrudes outside the crankcase 35 and forms a protruding section 70a. As shown in FIG. 2, a portion of the drive shaft 45 also protrudes outside the crankcase 35. A sprocket 54 is fixed to a protruding section 45a of the drive shaft 45. A chain 55 is wound around the drive shaft sprocket 54 and a sprocket (not shown) of the rear wheel 26.

Figure 6:
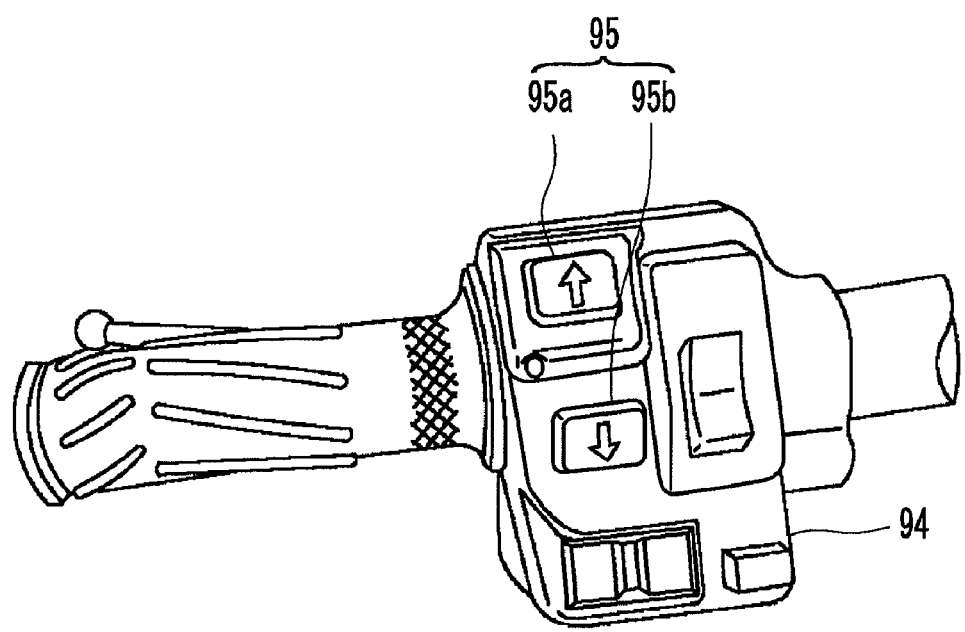
FIG. 6 is a perspective view of a switch box.

As shown in FIG. 6, a switch box 94 having a gearshift switch unit 95 preferably is disposed next to a grip of a handle bar on the left side. The gearshift switch unit 95 comprises, for example, an up-shift switch 95a and a down-shift switch 95b to allow a rider to move the shift position of the gear shifter up or down between a first shift stage and the maximum shift stage (for example, a sixth shift stage). When the up-shift switch 95a or the down-shift switch 95b is pushed, the actuator 75 rotates the shift shaft 70. With the rotation of the shift shaft 70, the gearshift clutch 37 is disengaged and combinations of some of the gears 46, 47 (combinations in which some of the gears 46, 47 mesh with each other) are changed. The gearshift operations thus are made.

Figure 7:
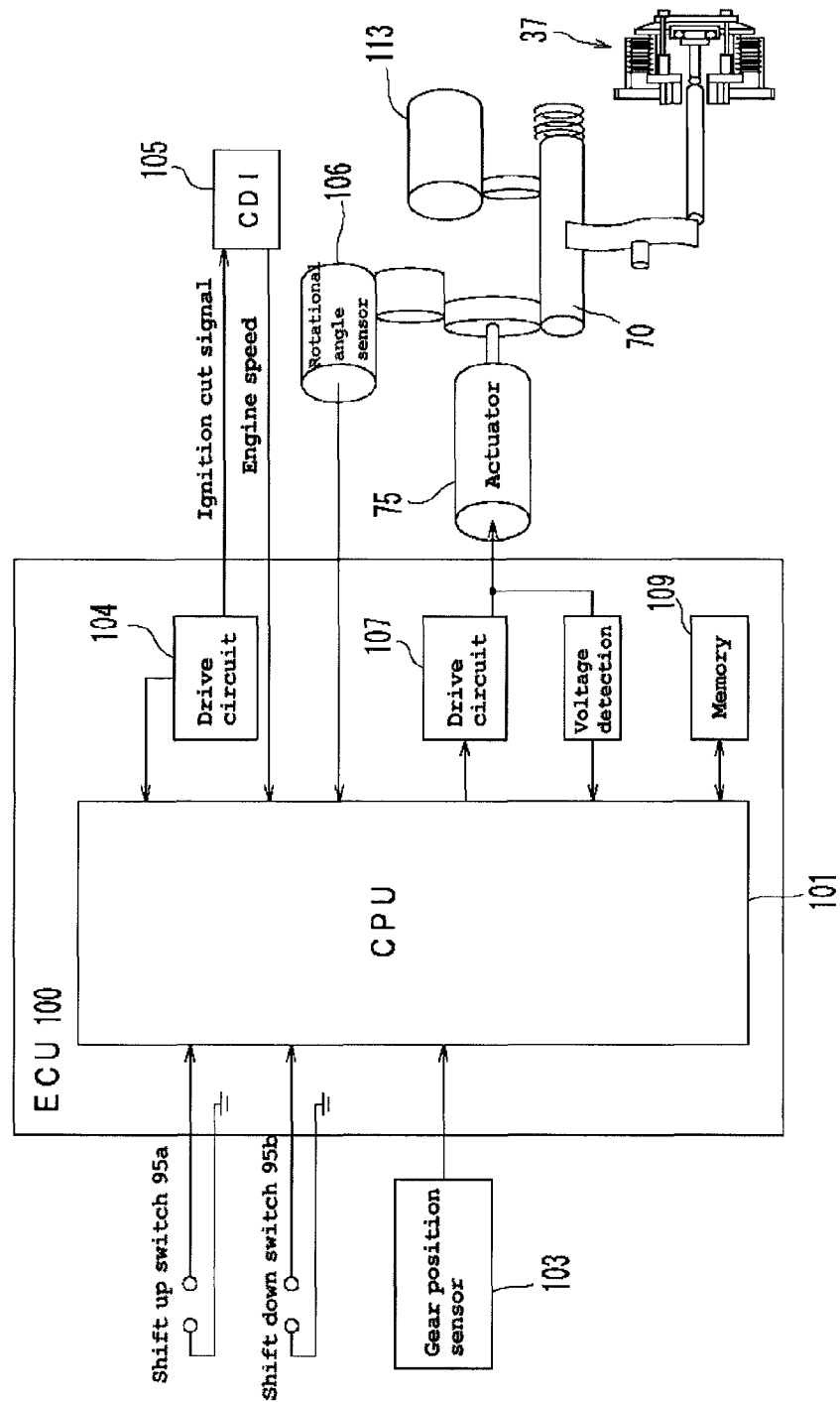
FIG. 7 is a block diagram schematically showing the overall structure of a control system incorporated in the motorcycle.

FIG. 7 is a block diagram schematically showing the overall structure of a control system incorporated in the motorcycle 10. An engine control unit (ECU) 100 has a central processing unit (CPU) 101. The up-shift switch 95a and the down-shift switch 95b are connected to the CPU 101.

A gear position sensor 103 is connected to the CPU 101. The gear position sensor 103 preferably is a sensor that detects gear positions (e.g., by detecting rotational positions of the shift cam 113). The CPU 101 obtains the gear positions based upon the rotational positions of the shift cam 113 (see FIG. 4) detected by the gear position sensor 103.

A capacitive discharge ignition (CDI) unit 105 is connected to the CPU 101 through a drive circuit 104. As shown in FIG. 2, the CDI unit 105 has an ignition plug 110 disposed to face the combustion chamber 110a of the engine 29. The ignition plug 110 ignites fuel in the combustion chamber 110a. As shown in FIG. 7, the CDI unit 105 cuts some ignitions of the engine 29 based upon ignition cut signals supplied from the CPU 101 through the drive circuit 104 to reduce the driving power of the engine 29. Also, the CDI unit 105 detects rotational speeds of the engine 29 (engine speeds) and supplies the engine speed to the CPU 101. Thus, the CDI unit 105 can function as the engine speed detecting device. Additionally, the engine speed detecting device can either directly or indirectly detect rotational speeds of the crankshaft 30 of the engine 29. Other suitable techniques and devices can be used to detect the engine speed.

The actuator 75 is connected to the CPU 101 through a drive circuit 107. The actuator 75 preferably comprises a motor, which is not shown. The drive circuit 107 controls operations (e.g., through pulse width modulation (PWM) control) of the motor of the actuator 75 based upon control signals sent from the CPU 101.

A rotational angle sensor 106 is connected to the CPU 101. The rotational angle sensor 106 detects rotational positions of the shift shaft 70. The rotational angle sensor 106 can directly detect the rotational positions of the shift shaft 70 or can indirectly detect them.

The ECU 100 has memory 109 including a ROM(s) and so forth.

Figure 8:
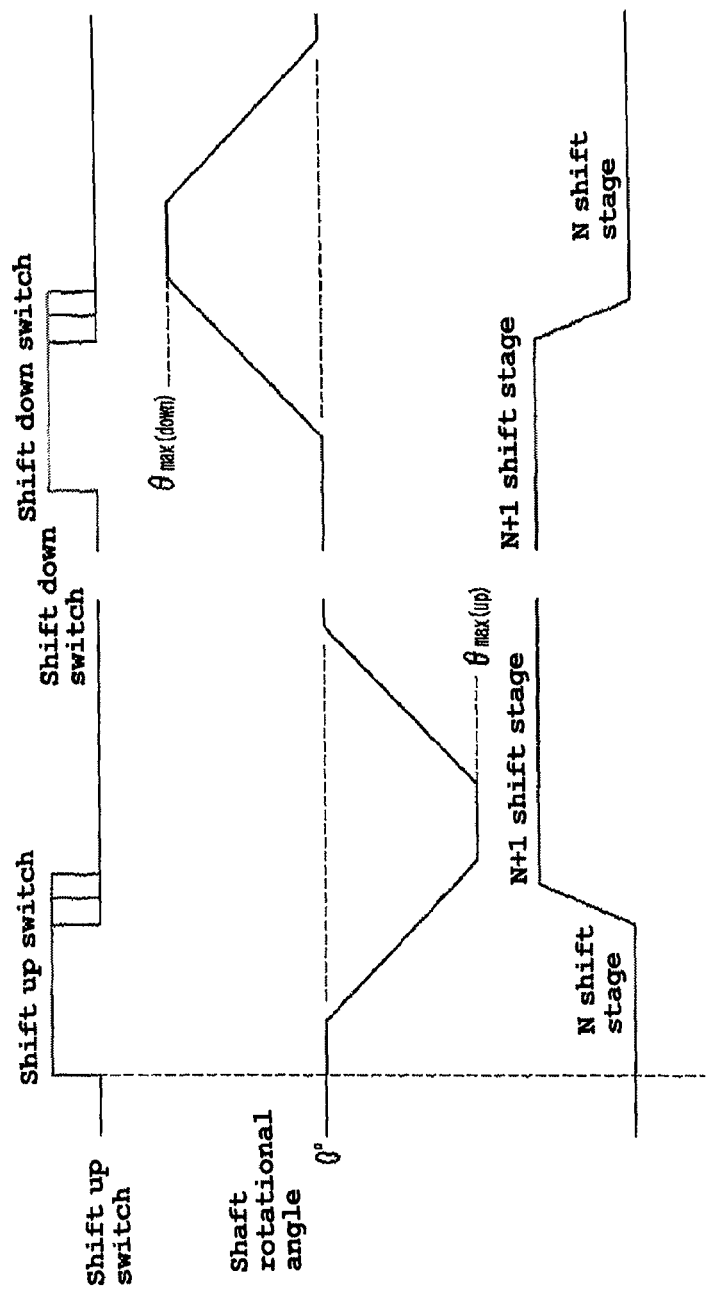
FIG. 8 is a time chart explaining gearshift operations.

Next, a gearshift operation of the motorcycle 10 will be described. FIG. 8 is an explanatory chart for explaining the gearshift operation. As shown in FIG. 8, when an up-shift operation is made (i.e., the up-shift switch 95a is operated), the shift shaft 70 makes a bidirectional rotational movement in which the shift shaft 70 rotates (reverse rotation) to reach a rotational position $\theta_{max(up)}$ and then returns to a reference angular position (0°). On the other hand, when a down-shift operation is made (the down-shift switch 95b is operated), the shift shaft 70 makes another bidirectional rotational movement in which the shift shaft 70 rotates (normal rotation) to reach a rotational position $\theta_{max(down)}$ and then returns to the reference angular position (0°).

The rotational position $\theta_{max(up)}$ preferably is a position where the gears of the gear shifter surely mesh with each other when the up-shift operation is made. Specifically, the rotational position $\theta_{max(up)}$ is a position of the shift shaft 70 when the shift shaft 70 rotates (reverse rotation) in the up shift direction and the gears of the gear shifter mesh with each other (gear meshing position under the reverse rotational condition), or a position at which the clutch is closer to the fully disengaged state than in the gear meshing position under the reverse rotational condition. In other words, during the rotation of the shift shaft 70, the gears change before the clutch reaches its fully disengaged state. Also, in one configuration, the rotational position $\theta_{max(up)}$ can be the maximum allowable rotation position of the shift shaft 70 in the reverse rotation (reverse rotation limit position), or it can be a position at which the clutch is closer to the fully engaged position than in the reverse rotation limit position.

The rotational position $\theta_{max(down)}$ is set to be a position where the gears of the gear shifter surely mesh with each other when the down-shift operation is made. Specifically, the rotational position $\theta_{max(down)}$ is a position of the shift shaft 70 when the shift shaft 70 rotates (normal rotation) in the down shift direction and the gears of the gear shifter mesh with each other (gear meshing position under the normal rotational condition), or a position at which the clutch is closer to the fully disengaged state than in the gear meshing position under the normal rotational condition. Also, in some configurations, the rotational position $\theta_{max(down)}$ is the maximum allowable rotation position of the shift shaft 70 in the normal rotation (normal rotation limit position), or a position at which the clutch is closer to the fully engaged position than in the normal rotation limit position.

The maximum rotation allowable positions (the reverse rotation limit position and the normal rotation limit position) preferably are the mechanically maximum rotational positions of the shift shaft 70. Respective magnitudes (absolute value) of the rotational position $\theta_{max(up)}$ and the rotational position $\theta_{max(down)}$ can be equal to each other or can be different from each other.

While the bidirectional rotational movement of the shift shaft 70 is made, the clutch 37 disengages, the gear shifter 38 shifts gears and the clutch 37 is reengaged, i.e., one series of the gearshift operation is executed.

Figure 9:
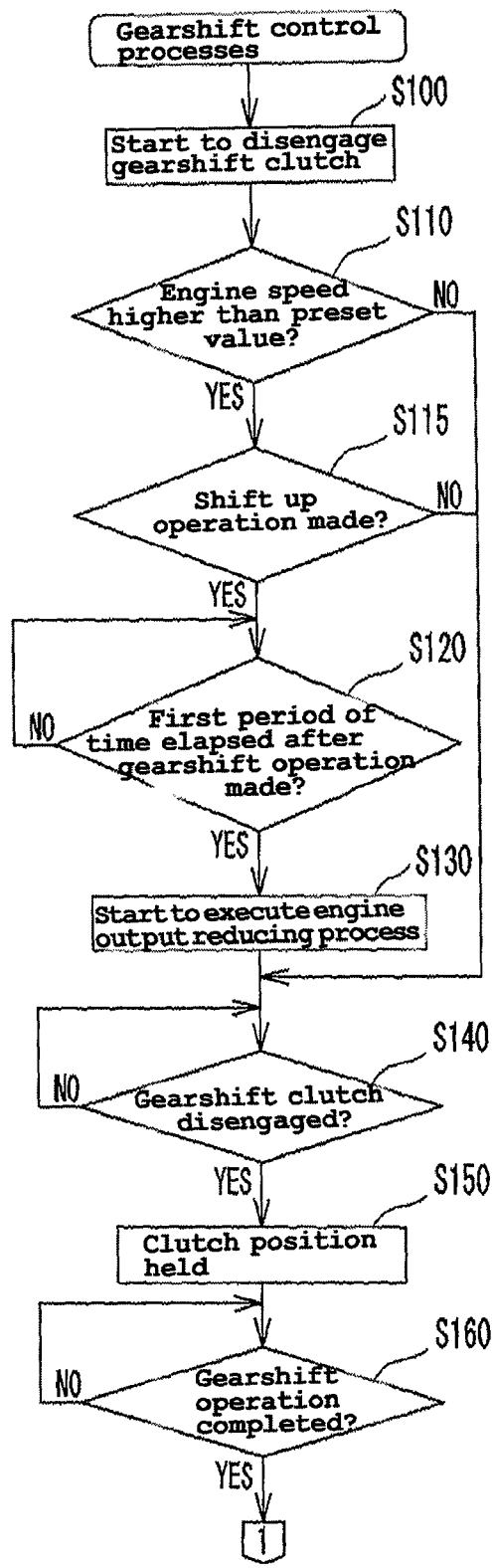
FIG. 9 is a flowchart showing gearshift control processes.
Figure 10:
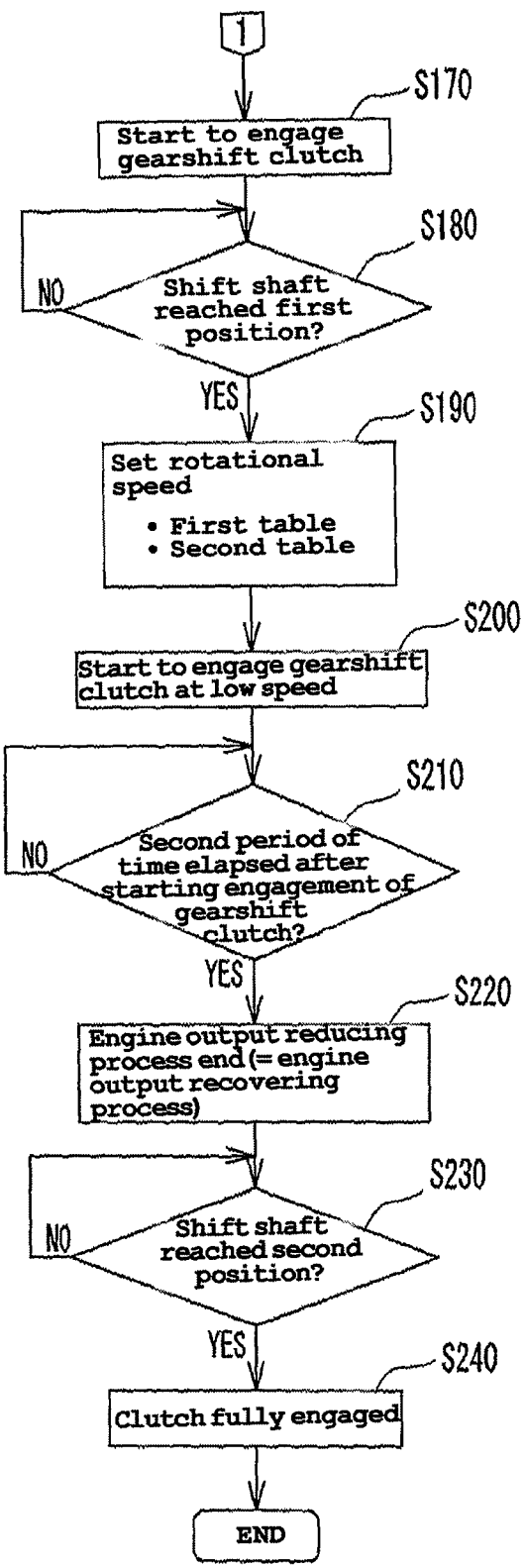
FIG. 10 is another flowchart showing gearshift control processes.
Figure 11:
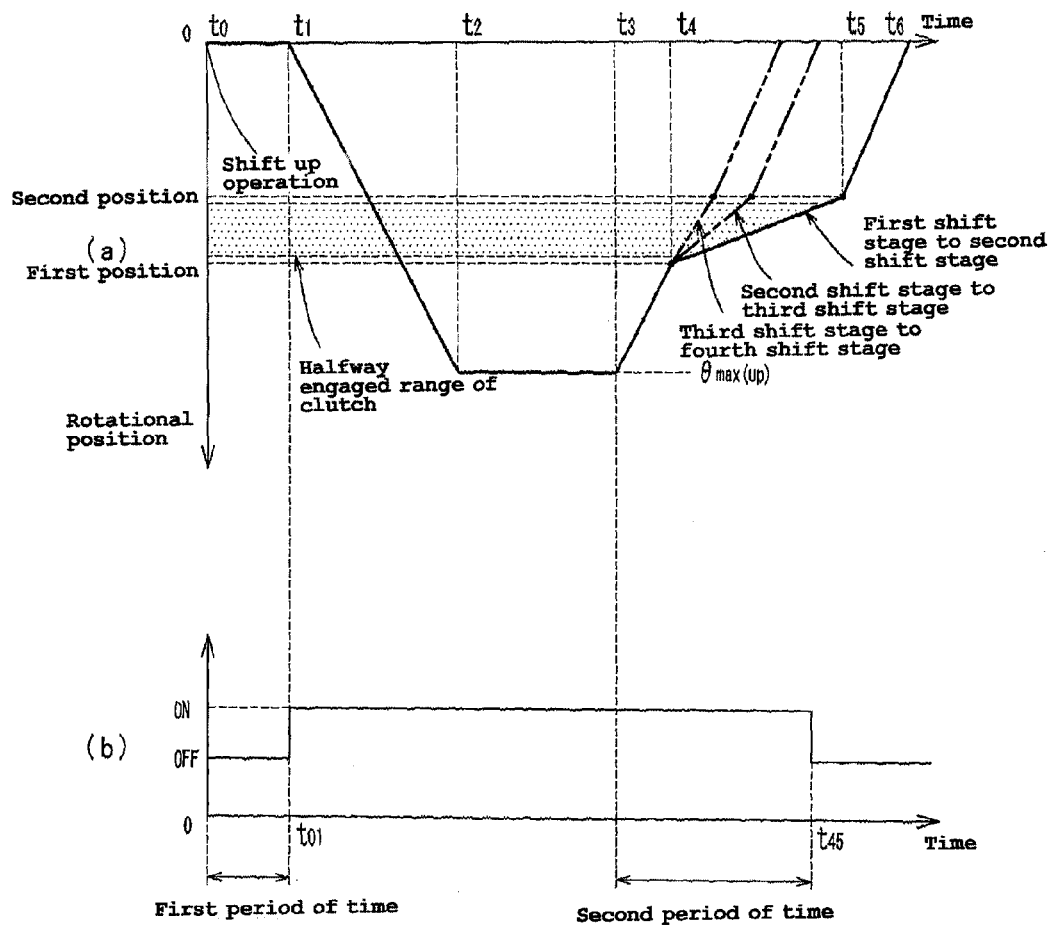
FIG. 11($a$) is a graph showing rotational positions of a shift shaft when the gearshift control processes are executed.

Hereunder, with reference to FIGS. 9 to 11, the gearshift operation will be described in detail. FIGS. 9 and 10 are flowcharts showing gearshift control processes. FIG. 11(a) shows changes of the rotational positions of the shift shaft 70 over time, while FIG. 11(b) shows changes of the engine output reducing process over time.

The gearshift control processes are executed after being called by the main routine that is previously executed, when the rider makes a gearshift operation, i.e., the rider operates the up-shift switch 95a or the down-shift switch 95b.

In general, the gearshift control processes are processes for rotating the shift shaft 70 and, thereby, for engaging/disengaging the gearshift clutch 37 and moving the gear shifter 38. In the control processes, first, the disengagement operation of the gearshift clutch 37 (time t0-t2 of FIG. 11(a)) is executed and the shift shaft 70 is rotated at the maximum rotational speed. Then, the clutch position of the gearshift clutch 37 is held at a preset position (time t2-t3). Afterwards, the processes move to the engagement operation of the gearshift clutch 37 (time t3-t6). On this occasion, first, before the rotational position of the shift shaft 70 reaches a first position described later (at which the clutch is in a state closer to the fully disengaged state than in a halfway engaged range in which the clutch is in a halfway engaged state) (time t3-t4), the shift shaft 70 is controlled to rotate at the maximum rotational speed. Next, before the rotational position of the shift shaft 70 reaches a second position described later (at which the clutch is in a state closer to the fully engaged state than in the halfway engaged range) from the first position (time t4-t5), the shift shaft 70 is controlled to rotate at a lower speed. When the rotational position of the shift shaft 70 reaches the second position, the shift shaft 70 is controlled to rotate at the maximum rotational speed until the rotational position reaches the reference position (0°) (time t5-t6) so that the clutch 37 is fully engaged.

As shown in FIG. 9, when the ECU 100 executes the gearshift control processes, the ECU 100 first starts the disengagement of the gearshift clutch 37 (see time t0 of FIG. 11). See S100. In this process, the ECU 100 controls the operation of the actuator 75 so that the shift shaft 70 starts to rotate and the gearshift clutch 37 starts to be disengaged. In some configurations, there can be a delay before the shift shaft 70 starts to rotate after the rider requests the gearshift operation (e.g., inputs a command signal through the up-shift switch 95a or the down-shift switch 95b). Therefore, as shown in FIG. 11, the time t1 at which the shift shaft 70 starts to rotate can be later than the time t0 at which the gearshift operation is made. In addition, at step S100, the shift shaft 70 rotates at the maximum rotational speed.

However, when the gearshift is made, the engine speed preferably is low because the gearshift clutch 37 is disengaged, which unloads the engine. Thus, in this embodiment, if the engine speed is high, the ECU 100 executes an engine output reducing process. On the other hand, if the engine speed is already low, the driving force transmitted from the engine to the gearshift clutch 37 is small. The low engine speed thus generates a relatively small shock when the gearshift clutch 37 is reengaged. Also, if the engine output reducing operation described later is used, engine braking is generated. If, however, the engine speed is low, the engine braking is unlikely required. Therefore, in this embodiment, if the engine speed is equal to or higher than a predetermined engine speed, the engine output reducing process is executed. If, on the other hand, the engine speed is lower than the predetermined engine speed, the engine output reducing process is not executed.

Specifically, after executing the process of step S100, the ECU 100 determines, at step S110, whether an engine speed is lower than (or equal to) a preset value or not. In the process of step S110, the ECU 100 obtains an engine speed at a moment that the gearshift operation is made based upon a detection result of the CDI unit 105, which functions as the engine speed detecting device in the illustrated embodiment, and determines whether the obtained engine speed is higher than (or equal to) the preset value or not. If the ECU 100 determines that the engine speed is equal to or lower than the preset value, the shock is expected to be small even though the gearshift clutch 37 is engaged under the condition that the engine output is not reduced. The ECU 100 thus goes to step S104 described later without executing the engine output reducing process.

On the other hand, if the ECU 100 determines at step S110 that the engine speed is equal to or higher than the preset value, the ECU 100 goes to step S115. At step S115, the ECU 100 determines whether the gearshift operation is the up-shift operation or not. Specifically, the ECU 100 determines whether the up-shift switch 95a is operated or not. If a determination result at step S115 is "YES," the ECU 100 goes to step S120 to execute the engine output reducing process. If, on the other hand, the determination result is "NO," the ECU 100 does not execute the engine output reducing process but goes to step S140.

In the illustrated embodiment, when a preset time has elapsed after the up-shift operation was requested, the ECU 100 starts the engine output reducing process to adjust a processing time for the engine output reducing process. However, it is of course practicable to start the engine output reducing process simultaneously with the up-shift request indicated by the switch 95a.

Specifically, the ECU 100 determines, at step 120, whether a preset time (i.e., a first period of time) has elapsed or not after the up-shift operation is made. The first period of time is a delay time before the engine output reducing process is started. If the ECU 100 determines that the first period of time has not elapsed, the ECU 100 returns to the process of step S120.

If the ECU 100 determines, at step S120, that the first period of time has elapsed after the up-shift operation is requested, the ECU 100 starts the engine output reducing process at step S130 (see the time t01 of FIG. 11(b)). Although any suitable manner can be used to reduce the engine output, in one configuration, the ECU 100 executes a process for inhibiting igniting operations of the ignition plug 110 (hereunder, called "ignition inhibiting process").

Next, the ignition inhibiting process will be described in detail. Additionally, the process described below is an example of the ignition inhibiting process. It is also practicable to execute other processes.

In the motorcycle 10 according to this embodiment, normally, a period in which the crankshaft 30 rotates twice is one cycle and the ECU 100 ignites the ignition plug 110 every cycle (normal output control). To the contrary, the ignition inhibiting process is a process in which the ignition plug 110 is not fired every cycle. In other words, ignitions of the ignition plug can be prohibited in one, two or more cycles for any one or more cylinders.

In one configuration, one set forming a predetermined ignition pattern includes eight cycles. As shown in FIG. 12(a), in the normal output control, the ignition plug 110 ignites in all of the first through eighth cycles. On the other hand, in the ignition inhibiting process, the ignition plug 110 ignites along one of ignition patterns in response to an engine speed. The ignition patterns having pattern numbers 1 through 8 are ignition patterns in which the ignition plug 110 is prohibited from igniting in [m] cycles (provided that [m] is a natural number equal to or less than [n]) of [n] (=8) cycles.

More specifically, in this embodiment, the ECU 100 compares respective actual engine speeds (i.e., detected engine speeds) and respective set engine speeds with each other in turn from the pattern number 8 to the pattern number 1. If a condition "actual engine speed≧set engine speed" is given, the ECU 100 operates the ignition plug 110 with the ignition pattern at this engine speed. If, on the other hand, another condition "actual engine speed<set engine speed" is given, the ECU 100 compares the actual engine speed with the next set engine speed having another pattern (pattern having the pattern number that is smaller by just one).

For example, if the actual engine speed is a predetermined engine speed Ne6.5 (provided that, Ne6<Ne6.5<Ne7), the ECU 100 applies the sixth ignition pattern. If the actual engine speed is a predetermined engine speed Ne4.5 (provided that, Ne4<Ne4.5<Ne5), the ECU 100 applies the fourth ignition pattern. Additionally, if the actual engine speed is less than the set engine speed Ne1, the ECU 100 executes the igniting operations in all of the cycles.

As thus described, in this embodiment, the inhibition of the igniting operations reduces the engine output.

After starting the engine output reducing process at step S130 as described above, the ECU 100 determines at step S140 whether the gearshift clutch 37 is disengaged or not. In this process, the ECU 100 determines whether the shift shaft 70 has reached the preset maximum rotational position and whether the gearshift clutch 37 is in the disengaged state or not. If the ECU 100 determines that the gearshift clutch 37 is not disengaged, the ECU 100 returns to the process of the step S140 and waits for the disengagement.

While the processes of steps S100 and S140 are executed, the shift shaft 70, as shown in FIG. 11(a), rotates at the maximum rotational speed until the rotational position reaches the maximum rotational position ($\theta_{max(up)}$) (time t2). Thereby, the gearshift clutch 37 is disengaged.

If the ECU 100 determines, at step S140, that the gearshift clutch 37 is disengaged, the ECU 100 executes a process at step S150 to hold the clutch position. Thereby, the clutch position of the gearshift clutch 37 is held in the disengagement state.

After executing the process of step S150, the ECU 100 next determines, at step S160, whether the gearshift has completed or not. In this process, the ECU 100 determines whether the gearshift of the gear shifter 38 has been completed or not based upon a detection result of the gear position sensor 103. If the ECU 100 determines that the gearshift has not been completed yet, the ECU 100 returns to the process of step S160 and waits for completion of the gearshift.

On the other hand, if the ECU 100 determines, at step S160, that the gearshift has been completed, the ECU 100 executes a process for starting the engagement of the gearshift clutch 37 at process S170 shown in FIG. 10 (time t3 of FIG. 11(a)). In this process, the ECU 100 controls the operation of the actuator 75 so that the shift shaft 70 rotates and the gearshift clutch 37 starts to be disengaged. Additionally, the rotational speed of the shift shaft 70 at step S170 is the maximum rotational speed, similar to the situation at step S100. Also, at step S170, the shift shaft 70 rotates in the opposite direction relative to the rotation of the shift shaft 70 in the process of step S100. The maximum rotational speed in the disengagement direction and the maximum rotational speed in the engagement direction can be the same or can be different from each other.

After executing the process of step S170, the ECU 100 determines, at step S180, whether the shift shaft has reached the preset first position or not. In this process, the ECU 100 determines whether the rotational position of the shift shaft 70 has reached the preset first position or not based upon a detection result of the rotational angle sensor 106. As shown in FIG. 11(a), the first position is the rotational position of the shift shaft 70 at which the clutch is in a state closer to the fully disengaged state to a certain extent than in a halfway engaged range in which the clutch is in a halfway engaged state. If the ECU 100 determines that the shift shaft 70 has not yet reached the first position, the ECU 100 returns to the process of step S180 and waits until the rotational position of the shift shaft 70 reaches the first position.

Because the processes of steps S170 and S180 are executed as described above, the shift shaft 70 rotates at the maximum rotational speed until the rotational position reaches the first position (time t4 of FIG. 11(a)).

If, at step S180, the ECU 100 determines that the rotational position of the shift shaft 70 has reached the first position, the ECU 100 executes, at step S190, a process for setting a rotational speed of the shift shaft 70. In this process, the ECU 100 sets the rotational speed of the shift shaft 70 continuing from the first position to the second position described later. The rotational speed of the shift shaft 70 from the first position to the second position is lower than the rotational speed from the disengagement position to the first position.

The rotational speed is flexibly set in accordance with the respective shift stages of the shiftable gears or with the operational conditions of the engine 29 to reduce shocks of the gearshift operations and further enhance the handling characteristics of the vehicle. Therefore, in one embodiment, the rotational speed is decided based upon the respective shift stages of the shift gears and the engine speeds. Specifically, the rotational speed is set to be the sum of a first speed decided based upon a first table, such as that shown in FIG. 13, and a second speed decided based upon a second table, such as one having the characteristics shown in FIGS. 14(a) and (b).

In this connection, the first speed is set every shift stage of the shift gears. That is, the rotational speed of the shift shaft 70 in its low speed rotation is set in accordance with the shift stages of the shift gears. Damping force generated in the vehicle body of the motorcycle 10 when the gearshifts are made preferably varies corresponding to the shift stages of the shift gears. Therefore, the setting of the fist speed in accordance with the shift stages enables the rotational speed to be set in accordance with the damping force.

FIG. 13 shows a table as one example of the first table referenced in the process of step S190. As described above, the first speed is set in accordance with the shift stages (up-shift or down-shift) of the shift gears. For example, in an up-shift operation from a first shift stage to a second shift stage, the first speed is set to be a speed $A012$. Also, for example, in a down-shift operation from a fourth shift stage to a third shift stage, the first speed is set to be a speed $\Delta\theta_{43}$. The first speed in the up-shift operation becomes larger in the order of $\Delta\theta_{12}$, $\Delta\theta_{23}$, $\Delta\theta_{34}$. That is, the lower the shift stage in the up-shift operation, the lower the rotational speed of the shift shaft 70, and the gearshift clutch 37 is engaged at the lower speed. Also, the first speed in the down-shift operation becomes larger in the order of $\Delta\theta_{21}$, $\Delta\theta_{32}$, $\Delta\theta_{43}$. In the down-shift operation, similar to the up-shift operation, the lower the shift stage in the down-shift operation, the lower the rotational speed of the shift shaft 70 (see FIG. 11(a)).

As discussed above, in this embodiment, the second speed is applied as a factor for setting the rotational speed of the shift shaft 70 in its low speed rotation from the first position to the second position. In this connection, the second speed is set in accordance with the engine speed. That is, the rotational speed in the low speed rotation is set in accordance with the engine speed given when the gearshift operation is made. Therefore, an engagement speed of the gearshift clutch 37 can be set in accordance with magnitudes of the engine power transmitted to the gearshift clutch 37.

FIGS. 14(a) and (b) show graphs representing one example of characteristics of the second table referenced in the process of step S190. FIG. 14(a) shows the second table referenced in the up-shift operation. FIG. 14(b) shows the second table referenced in the down-shift operation. As shown in FIGS. 14(a) and (b), the second speed is set based upon engine speeds and either one of the up-shift operation or the down-shift operation. In one embodiment, the engine speed is the engine speed given when the gearshift operation is requested (i.e., when the up-shift switch 95a or the down-shift switch 95b is operated) and is the engine speed given when the gearshift control processes are started (see time t0 of FIG. 11(a)). However, the engine speed that is referenced is not limited to the engine speed given when the gearshift operation is requested but can be an engine speed detected at another time during the shifting operation.

As shown in FIG. 14(a), in the up-shift operation, if the engine speed is between a speed N1 and a speed N2, the second speed that is set increases with the increase of the engine speed. If the engine speed exceeds the speed N2, the second speed is fixed to a speed $\Delta\theta_a$. On the other hand, in the down-shift operation, if the engine speed is between "0" and a speed N3, the second speed that is set is fixed to a speed $\Delta\theta_b$. If the engine speed is between the speed N3 and a speed N4, the second speed that is set decreases with the decrease of the engine speed. If the engine speed exceeds the speed N4, the second speed is "0."

As discussed above, the rotational speed of the shift shaft 70 from the first position to the second position is set to be the sum of the first speed (e.g., the speed set based upon the first table such as that shown in FIG. 13) and the second speed (e.g., the speed set based upon the second table, such as that shown in FIGS. 14(a) and (b)). For example, if an up-shift operation from the first shift stage to the second shift stage is being executed and the engine speed given when the gearshift operation is made is the speed N2, the rotational speed of the shift shaft 70 is a speed $\Delta\theta_{12}+\Delta\theta_a$. Also, for example, if a down-shift operation from the fourth shift stage to the third shift stage is being executed and the engine speed given when the gearshift operation is made is the speed N4, the rotational speed of the shift shaft 70 is a speed $\Delta\theta_{43}+$"0"$=\Delta\theta_{43}$.

After executing the process of step S190, the ECU 100 starts, at step S200, to control the shift clutch to be engaged at a low speed (see time t4 of FIG. 11(a)). In this process, the ECU 100 controls the actuator 75 to operate based upon the rotational speed of the shift shaft 70 set in the process of step S190. When the ECU 100 executes this process, the shift shaft 70 rotates at a speed that is low and is the rotational speed set in the process of step S190. The gearshift clutch 37 thus is engaged at the low speed.

FIG. 11(a) shows an example in which the engine speeds in the gearshift operations made in the respective shift stages are the same as each other. That is, FIG. 13 and FIG. 14 show such an example in which the second speeds decided in accordance with the engine speeds in connection with the respective shift stages are the same as one another. As shown in FIG. 11(a), in both of the up-shift operation and the down-shift operation, the higher the shift stage toward which the gearshift is made, the higher the rotational speed of the shift shaft 70. Because large speed reduction force is generated in the gearshift operation to the lower shift stage, it is preferred to slow the rotational speed and to engage the gearshift clutch 37 at the lower speed, as described above.

After executing the process of step S200, the ECU 100 determines, at step S210, whether a second period of time has elapsed or not from the start of the shift clutch engagement operation. The second period of time is, similar to the first period of time, a delay used to accommodate the process time of the engine output reducing process. When this second period of time elapses, the ECU 100 ends the engine output reducing process. Specifically, the ECU 100 determines whether the preset time (second period of time) has elapsed or not after starting of the engagement of the gearshift clutch 37 in the process of step S170. If the ECU 100 determines that the second period of time has not elapsed yet, the ECU 100 returns to the process of step S210 and waits until the second period of time has elapsed.

In this embodiment, the second period of time is generally set every shift stage toward which the shift up operation is made. Specifically, in a preset plurality of shift stages (the first shift stage through the third shift stage), the lower the shift stage toward which the shift up operation is made, the longer the second period of time. Accordingly, in the shift up operation, the lower the shift stage toward which the shift up operation is made, the longer the executing time for the engine output reducing process.

On the other hand, if the ECU 100 determines, at step S210, that the second period of time has elapsed, the ECU 100 ends the engine output reducing process at step S220 (see time t45 of FIG. 11(b)). In other words, the ECU 100 executes an engine output recovering process whereby the ECU 100 increases the engine output. Additionally, if the ECU 100 determines that the engine speed is lower than the preset value in the process of step S110 (see FIG. 9), the ECU 100 does not start the engine output reducing process at step S130. Thus, the ECU 100 does not execute the process of step S220.

Alternatively, the ECU 100 can immediately execute the engine output recovering process. That is, after the moment that the ignition cut signals from the ECU 100 to the CDI unit 105 are no longer provided, the ignition pattern can be changed to the all ignition pattern (see FIG. 12(a)). However, if the gearshift is made while the throttle valve is in an open position, a large shock is likely to be generated in the recovering operation of the engine output. Therefore, preferably, the engine output is gradually recovered to reduce the shock following the gearshift and to enhance the operating characteristics of the vehicle.

In one embodiment, when the engine output is recovered, the prohibiting times of the igniting operations (i.e., the skipped ignition cycles) of the ignition plug 110 in [n] cycles are decreased step by step from [m] times (provided that [m] is a natural number equal to or less than [n]) to none. Additionally, the term "step by step" is not limited to a condition under which the prohibiting times of the igniting operations are decreased one by one.

Figure 15:
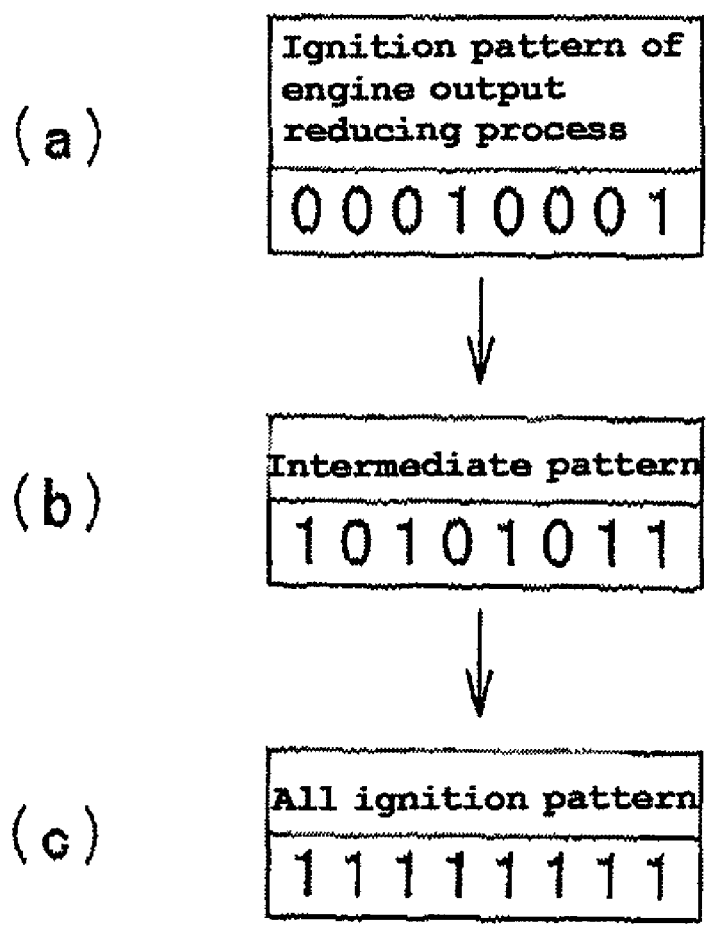
FIG. 15($a$), FIG. 15($b$) and FIG. 15($c$) are diagrams showing ignition patterns of the engine output recovering process.

For example, if the ECU 100 executes the ignition pattern shown in FIG. 15(a) in the engine output reducing process, the ECU 100 can execute an intermediate pattern shown in FIG. 15(b), rather than immediately changing to the all ignition pattern shown in FIG. 15(c) along with the end of the engine output reducing process, between them. In this embodiment, the ECU 100 executes the intermediate pattern once and only once (for eight cycles). Other embodiments are possible.

Because a recovery process is executed, the engine output is smoothly recovered. Therefore, even though the gearshift is made while the throttle valve is in an open position, no large shock typically is generated in the recovering operation from the engine output reducing process and the operating characteristics of the vehicle are enhanced.

After executing the process of step S220, the ECU 100, next, determines, at step S230, whether the shift shaft 70 has reached the second position or not. In this process, the ECU 100 determines whether the rotational position of the shift shaft 70 has reached the preset second position or not based upon a detection result of the rotational angle sensor 106. As shown in FIG. 11(a), the second position is the rotational position of the shift shaft 70 at which the clutch is in a state closer to the fully engaged state to a certain extent than in the halfway engaged range. If the ECU 100 determines that the shift shaft 70 has not yet reached the second position, the ECU 100 returns to the process of step S230 and waits until the rotational position of the shift shaft 70 reaches the first position.

On the other hand, if the ECU 100 determines, at step S230, that the rotational position of the shift shaft 70 has reached the second position (see time t5 of FIG. 11(a)), the ECU 100 executes a process for fully engaging the gearshift clutch 37 at step S240. In this process, the ECU 100 controls the actuator 75 to rotate the shift shaft 70 until the rotational position reaches the reference position (0°) from the second position. The rotational speed of the shift shaft 70 on this occasion preferably is the maximum rotational speed. After executing the process of step S240, the ECU 100 ends the gearshift control process (time t6 of FIG. 11(a)).

As described above, according to this embodiment, if the engine speed reaches or exceeds the preset value in the up-shift operation, the ECU 100 executes the engine output reducing process. Therefore, even though the rider operates the up-shift switch 95a while the throttle valve is in an open position, the engine speed does not rapidly increase. The shift shock generated at the engagement moment of the gearshift clutch 37 thereby can be reduced.

Also, in this embodiment, the engine output is reduced by inhibiting ignition operations of one or more ignition plug 110. The engine output thus can be easily and accurately reduced. More specifically, in the illustrated embodiment, eight cycles are bundled to one set and the ignition cut process prohibiting the igniting operations of the ignition plug 110 is executed in one, two, or more of the eight cycles. Because of such a process, the engine output can be easily and accurately reduced.

However, the engine output reducing process can be any process or combination of processes that are effective to reduce the engine output. The engine output reducing process is not limited to inhibiting the igniting operations of the ignition plug 110. For example, the engine output reducing process can be a process that reduces a fuel supply amount. For example, the engine 29 can employ a fuel injector (not shown) disposed in an air intake passage (not shown), and one, two, or more of periodic fuel injections from the fuel injector can be prohibited (e.g., a fuel cut process). Such a process can reduce the engine output.

After the engine output reducing process is executed, the engine output is gradually recovered rather than being immediately recovered. Therefore, the shock generated when the engine output is recovered can be reduced. One technique for gradual recovery can involve slowly reintroducing the igniting operations of the ignition plug 110 step by step. Moderate recovery of the engine output thus can be easily realized.

In the illustrated configuration, when the engine output reducing process is executed, eight cycles are bundled to one set and the igniting operations are prohibited in [m] cycles ([m] is a natural number equal to or less than eight) of the eight cycles. However, when the engine output recovering process is executed, the prohibiting times are decreased step by step from [m] times to none over time. The decrease need not by one at a time and can involve multiple ignitions that are recovered in any given bundle. Such processes can easily realize the gradual recovery of the engine output.

According to this embodiment, the execution time of the engine output reducing process is set every shift stage toward which the up-shift operation of the gear shifter 38 is made. Therefore, the engine output reducing process corresponding to drive situations of the motorcycle 10 can be made. The engine output reducing process thus can be properly executed.

In the preset plurality of shift stages, the lower the shift stage of the gear shifter 38 toward which the up-shift operation is made, the longer the execution time for the engine output reducing process. Specifically, the second period of time is set as a waiting time for adjusting the processing time of the engine output reducing process (see FIG. 11(b)), and the lower the shift stage toward which the up-shift operation is made, the longer the second period of time. Thereby, the shock following the recovery of the engine output can be further reduced.

Alternatively, the process for changing the execution time of the engine output reducing process such that the executive time varies with the shift stage toward which the up-shift operation is made (hereunder, called "change process") can be made in accordance with the engine speed. For example, it is practicable to retain the change process when the engine speed is lower than a preset value and to execute the change process only when the engine speed is equal to or larger than the preset value.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A straddle type vehicle comprising:
   a drive power source arranged to generate a driving force;
   a shift shaft arranged to be rotated by the driving force of the drive power source;
   an engine including a gear shifter and a clutch connected to the engine;
   a power transmitting mechanism connecting the shift shaft to the clutch and to the gear shifter, the power transmitting mechanism arranged to move the clutch between an engaged position and a disengaged position, the power transmitting mechanism also arranged to cause movement of the gear shifter during a shift operation;
   an engine speed detecting device arranged to detect an engine speed of the engine; and
   an engine control device arranged and programmed to control an output of the engine; wherein
   the engine control device, when a detected engine speed reaches or exceeds a preset value during an up-shift operation, executes an engine output reducing process in which the output of the engine is reduced to be less than an output of the engine when the detected engine speed does not reach the preset value;
   the gear shifter includes a plurality of sequentially numbered shiftable gears corresponding to a plurality of shift stages, and an execution time of the engine output reducing process is assigned to each of the shift stages; and
   the execution time of the engine output reducing process becomes longer as a number of the sequentially numbered shiftable gear and the corresponding shift stage becomes lower.

2. The straddle type vehicle according to claim 1, wherein the engine includes a combustion chamber to which fuel is supplied and an ignition device disposed in the combustion chamber and arranged to ignite fuel in the combustion chamber, and the engine output reducing process inhibits one or more ignition cycles of the ignition device.

3. The straddle type vehicle according to claim 1, wherein the engine control device is arranged and programmed to perform a normal output control to cause an ignition device to ignite every preset cycle, and the engine output reducing process prohibits ignition of the ignition device in at least one of the preset cycles.

4. The straddle type vehicle according to claim 1, wherein the engine control device is arranged and programmed to execute an engine output recovering process to gradually increase the output of the engine after executing the engine output reducing process.

5. The straddle type vehicle according to claim 4, wherein the engine includes a combustion chamber to which fuel is supplied and an ignition device arranged to ignite fuel in the combustion chamber, and the engine output reducing process inhibits ignition by the ignition device, and the engine output recovering process recovers ignition by the ignition device step by step.

6. The straddle type vehicle according to claim 1, wherein
   the engine control device is arranged and programmed to perform a normal output control to cause the ignition device to ignite every preset cycle;
   the engine output reducing process prohibits ignition operation by the ignition device in m cycles out of n cycles where n is greater than 2; and
   the engine output recovering process decreases a number of the prohibited ignition operations of the ignition device in the n cycles from the m times to zero times.

7. A method for using a single actuator to control clutch movement and shifting movement, the method comprising:
   rotating a shaft in a first direction to disengage a clutch;
   further rotating the shaft in the first direction to move a shifter from a first position to a second position;
   rotating the shaft in a second direction to engage the clutch; and
   reducing an engine speed of an engine connected to the clutch to a speed lower than a predetermined engine speed before the clutch is fully reengaged; wherein
   the shifting movement includes a plurality of sequentially numbered shiftable gears corresponding to a plurality of shift stages; and
   extending an execution time of the step of reducing the engine speed of the engine as a number of the sequentially numbered shiftable gear and the corresponding shift stage becomes lower.

8. The method of claim 7, further comprising the step of:
detecting the engine speed prior to the step of reducing the engine speed and reducing the engine speed only if the detected engine speed is equal to or higher than the predetermined engine speed.

9. The method of claim 7, further comprising the step of:
recovering the engine speed gradually after the clutch is engaged.

10. The method of claim 7, wherein the engine includes an internal combustion engine.

11. The method of claim 10, wherein the internal combustion engine includes an ignition source and the step of reducing the engine speed includes:
inhibiting one or more ignitions of the ignition source.

* * * * *